Figure 1:
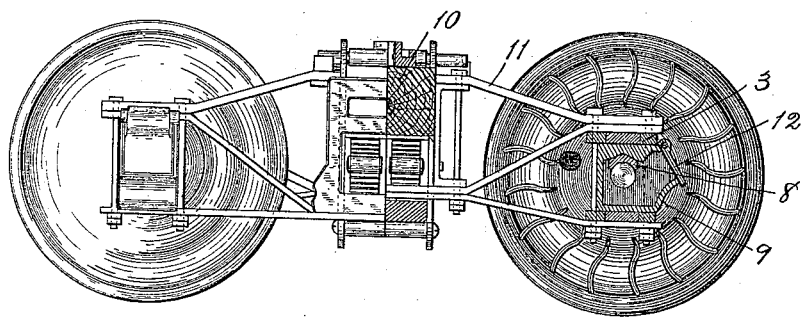

(No Model.)

J. A. MAHOOD.
RAILWAY CAR AXLE.

No. 441,014. Patented Nov. 18, 1890.

Witnesses
Lillie Hanna
Mazie V. Bidgood

Inventor
James A. Mahood
By Knight Bros
Attorneys

UNITED STATES PATENT OFFICE.

JAMES A. MAHOOD, OF VICTORIA, CANADA.

RAILWAY-CAR AXLE.

SPECIFICATION forming part of Letters Patent No. 441,014, dated November 18, 1890.

Application filed March 4, 1890. Serial No. 342,540. (No model.)

*To all whom it may concern:*

Be it known that I, JAMES A. MAHOOD, of Victoria, a British subject, residing in the city of Victoria, in the Province of British Columbia, Dominion of Canada, have invented a new and useful Improvement in Railway-Car Axles, of which the following is a specification.

My invention is an improvement in those running-gears of car-trucks in which each wheel is attached to a separate axle which, meeting endwise that of the like axle from the other side of the truck, the two are journaled in a common bearing in a frame which extends from and is rigidly attached to the bolster and are held against endwise contact and disturbance by means of coupling-yokes that, being bolted on opposite sides of the said axles, engage in collars turned in said axles. These bearings are constructed so as to discharge also the functions of grease-boxes which resemble those employed for the outer bearings, except that access is had to them, not at the end, but at the side of the axles.

The object of dividing the axle into two parts midway of its length is to give each wheel an independent motion, thereby enabling the wheels on the outside rail of a curve to travel faster than those on the inner rail, and thus accomplishing the greater circumference in the same time, also removing the risk of breaking an axle from torsional strain; and this invention can be applied to all and any railway-stock now in use, without the cost of manufacturing new axles or wheels, by simply cutting the axle fairly and smoothly in two, turning a few inches of these ends to give a bearing in the journal-boxes, and by any modification of arch and tie bars securing the same to any species of car-truck or engine, street or other cars.

My construction of journal-boxes, arch, and tie-bars serves to carry the two inner ends of divided axle and to properly secure the same to frame of truck or locomotive, as the case may be, the inner ends of the axle being turned to fit and have a firm and smooth bearing in the boxes, as fully as the outer ends are supported. These boxes, fitted with the necessary brasses, wedges, &c., have an opening and cover on the side instead of at the ends, as those at present in use have for the purpose of lubricating, examination, &c.

By experiment I have proved that in the case of a car-truck as at present constructed, with the bearings and load on the outer ends of the axles outside the wheels, the tendency would be, if the axles were divided in the middle, as above mentioned, for the two inner ends to fly upward and not to fall to the ground. Consequently when the axles are divided the middle journals require bearings or brasses only on the top of the axle similar to those at the outer ends.

My coupling and collars connecting the two half-axles are intended to prevent the wheels from spreading at a switch-crossing, or any other interruption to an unbroken rail, and to make the axle as strong lengthwise as though undivided. They also answer the purpose that an additional bearing on the under side of the journals would have by holding up the inner ends of the axles and preventing them dropping down from the upper bearing if any momentary concussion should give them a tendency to do so. The coupling, as seen by the drawings, is in two parts, one above and the other below the middle journal-box and screwed together at the collars. The axle is turned down where the collars clasp it to the same diameter as the other journals, and the inside of collars is made slightly larger in diameter than these journals, so that while the axle revolves within them they do not touch it, and there is consequently no friction. As long as the car is running on an unbroken line the coupling will not be called into play, as the journals at the outer and inner ends of the two half-axles will keep their positions steadily in their bearings, and the necessity for the couplings can only arise, and then only for a moment, at, possibly, some frog, guard-rail, or similar break in the rail. It would then act effectually, and I consider this coupling a most important part, as I think it is entirely novel. The part of the coupling on the upper side of the axle may be made wide enough to be the covering of the top of the box.

Referring to the accompanying drawings, which form a part of this specification, Figure 1 is a partly sectional end elevation of a rail-

Figure 2:
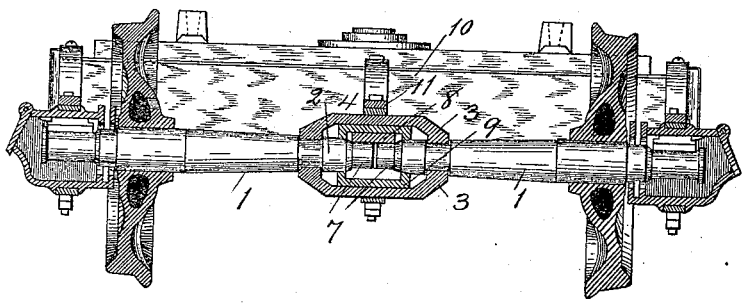
Figure 3:
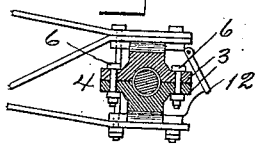
Figure 4:
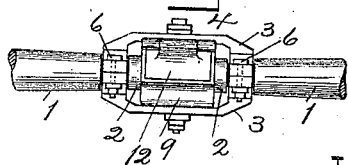

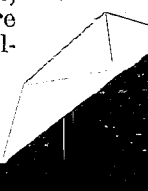

way-truck provided with my improvement. Fig. 2 is a section in the plane of my compound axle. Fig. 3 is a section of the outer bearing in the plane of one of the collars. Fig. 4 is a side view of the outer bearing.

Each car-wheel has keyed fast to it a separate axle 1, which extends underneath the car until it nearly touches the corresponding axle, as plainly shown in Fig. 2. Each axle is turned down at a proper distance from its end to form a collar 2 for engagement of the two jaws 3 of a coupling-yoke 4, which, being secured to the central bearing 5, prevents actual contact of the axles with each other and also prevents any longitudinal separation or shift of said axles. These jaws are clamped to their place upon the collars by screw-bolts 6. The inner extremity of each axle is turned down to constitute a journal 7, which bears upwardly by step or boxing 8 against the roof of the combined grease and bearing box 9, which has rigid attachment to the bolster 10 by a truss or bridge and tie-frame or bracket 11. The form and dimensions of the central bearing are such as to constitute it a grease-box whose door or lid 12 on the axle side is presented toward the outside end of the truck so as be readily accessible.

The advantages that I claim for this improvement are that a car will run as easily around a curve or imperfectly-laid track as on a smooth straight line, thus requiring less engine-power to haul a train on a crooked or badly-laid track; or, in other words, a heavier train can be hauled with the same power. Railways can be built with much sharper curves than are at present admissible, thus reducing very materially the first cost of construction. The friction on rails being so diminished or removed, their life will be correspondingly longer. Axles will not be broken from torsional strains, and a large percentage of accidents is due to broken axles. Wheels will be less strained, and rolling-stock, as well as road-bed, will suffer less from wear and tear. An axle constructed in this manner is stronger than an undivided one.

For that form of my invention in which the weight of the upper structure comes on the inner sides of the wheels the central bearings will be provided with brasses on their under side, because in such form the tendency of the inner ends of the divided axle will be to press, not upward, as in the present instance, but downward. As, however, this application of my invention requires a number of special adaptive contrivances which I am now testing, I reserve it for subject-matter of a separate application for patent.

I make no claim to the journal-boxes and brasses as journal-boxes and brasses, nor to the arch and tie-bars, as I am aware that they are not new, except the difference of the opening on the side for lubricating purposes.

I am also aware that the principle of dividing the axle into two for the purpose of giving independent motions to the wheels has been made known.

Having thus described my invention, the following is what I claim as new therein and desire to secure by Letters Patent:

1. The combination of the centrally and transversely divided car-axle 1, bearing-box 9, and the two-part coupling-yoke 4, spanning the box and engaging grooves in each section of the axle, substantially as and for the purpose set forth.

2. The coupling-yoke 4, holding securely together the centrally and transversely divided axle 1 and having one bearing 8 on upper side of journals and securing the same by one set of arch and tie-bars 11 to the bolster 10.

3. The combination of bolster 10, bracket 11, central bearing 9, the bolster two-part coupling-yoke 4, and the collared and journaled compound axle 1, as and for the purposes set forth.

4. The combination, with a centrally and transversely divided and centrally-supported car-axle 1, of the combined grease-box and central bearing 9, having its ordinary door or flap 12 on the side of the axle, as set forth.

JAS. A. MAHOOD.

Witnesses:
W. CHANTRELL MARTIN,
*Clerk to U. S. Cons.*,
FREDERIC C. ROBERTS.